United States Patent [19]

Yamada et al.

[11] Patent Number: 4,978,201
[45] Date of Patent: Dec. 18, 1990

[54] METHOD FOR MEASURING SPLICE LOSS OF AN OPTICAL FIBER

[75] Inventors: Takeshi Yamada; Tsutomu Onodera; Hiroyuki Taya, all of Sakura, Japan

[73] Assignee: Fujikura Ltd., Tokyo, Japan

[21] Appl. No.: 302,617

[22] Filed: Jan. 26, 1989

[30] Foreign Application Priority Data

Jan. 30, 1988 [JP] Japan .................................. 63-20022

[51] Int. Cl.[5] .......................... G02B 6/255; G02B 6/38
[52] U.S. Cl. .................................... 350/320; 350/96.21
[58] Field of Search ................. 350/320, 96.15, 96.16, 350/96.2, 96.21; 356/73.1

[56] References Cited
U.S. PATENT DOCUMENTS

| | | | |
|---|---|---|---|
| 4,179,186 | 12/1979 | Tynes | 350/96.21 |
| 4,274,707 | 6/1981 | Pacey et al. | 350/96.20 |
| 4,557,556 | 12/1985 | Decker, Jr. | 350/96.15 |
| 4,557,557 | 12/1985 | Gleason et al. | 350/96.21 |
| 4,636,033 | 1/1987 | Gagen | 350/96.24 |
| 4,659,217 | 4/1987 | Shen et al. | 356/73.1 |
| 4,679,908 | 7/1987 | Goodwin | 350/96.2 |
| 4,708,476 | 11/1987 | So et al. | 356/73.1 |
| 4,736,632 | 4/1988 | Case | 350/96.2 |
| 4,812,010 | 3/1989 | Osaka et al. | 350/96.21 |

OTHER PUBLICATIONS

The Bell System Technical Journal, vol. 56, No. 5, 1977; "Loss Analysis of Single Mode Fiber Splices", by D. Marcuse.
The Bell System Technical Journal, Jan. 1977, vol. 56, No. 1.
Spot Size Measurements for Single-Mode Fibers—A Comparison of Four Techniques, 1983 IEEE, W. T. Anderson et al.

Primary Examiner—Bruce Y. Arnold
Assistant Examiner—Thong Nguyen
Attorney, Agent, or Firm—Frishauf, Holtz, Goodman & Woodward

[57] ABSTRACT

In a method for estimating a splice loss of a spliced portion of a fusion-spliced optical fiber, an amount of axial deviation attained prior to or immediately after heating a pair of optical fibers and an amount of axial deviation attained upon completion of heat treatment on the optical fibers are first detected to provide a difference between the axial deviations, and a splice loss originated from an opposite-phase core distortion is estimated based on the difference between the axial distortions.

7 Claims, 12 Drawing Sheets

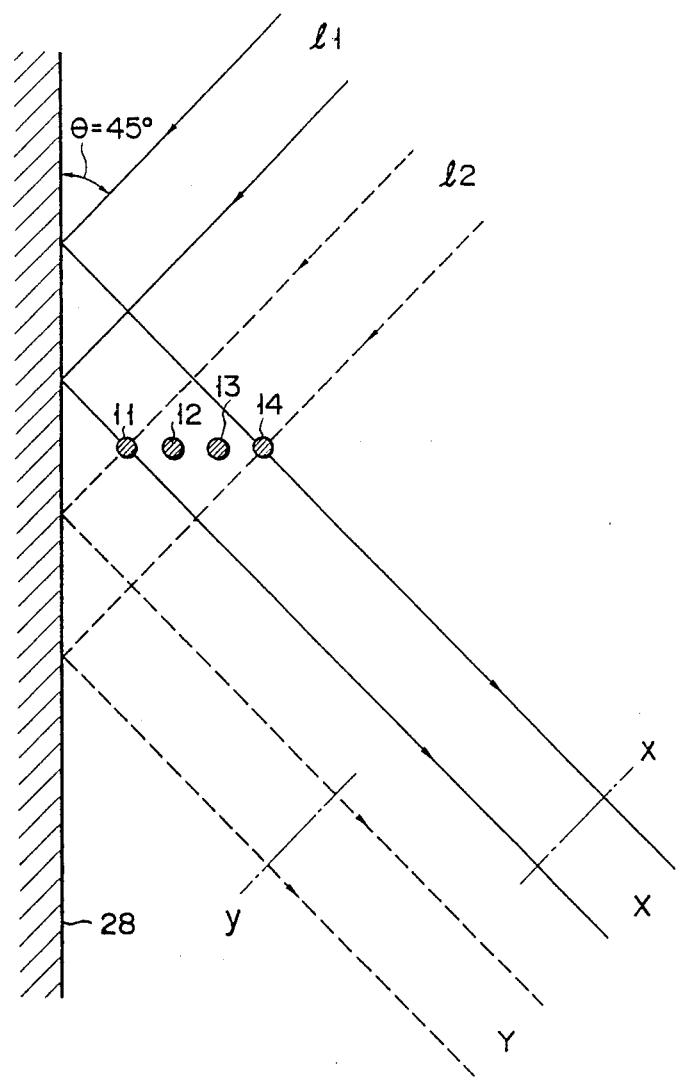
F I G. 13

METHOD FOR MEASURING SPLICE LOSS OF AN OPTICAL FIBER

BACKGROUND OF THE INVENTION

1. Field of the Invention

The present invention relates to a method for estimating a splice loss of a spliced section of a fusion-spliced optical fiber.

2. Description of the Related Art

Conventionally, the splice loss of a spliced section of an optical fiber is measured by a power monitor method. According to this method, light is permitted to pass through the optical fiber via the spliced section and the splice loss of the spliced section is measured from the amount of light received.

Due to the necessity to permit light to pass through an optical fiber, the power monitor method, however, has a low operability. In this respect, therefore, an outline monitor method has recently been used frequently for its higher operability. (D. Marcuse "Loss Analysis of Single Mode Fiber Splices", BSTJ, Vol. 56, No. 5, 1977; Satoru Yamazaki et al. "Simple Splicing Method for Single Mode Optical Fiber", National Conversation Record No. 2108, 1987, The Institute of Electronics Information And Communication Engineers; Akihiko Ishikura et al. "Splice Loss Factor Analysis for Subscriber Single-Mode Fibers", National Conversation Record No. 2100, 1987, The Institute of Electronics Information And Communication Engineers; Atsushi Ide et al. "Loss Assurance Method for SM-Fiber Mass-Splice Using Image Measurement", National Conversation Record NO. 2101, 1987, The Institute of Electronics Information And Communication Engineers). According to the Yamazaki et al. method, light is irradiated on the spliced section from two directions, X and Y, normal to each other to pick up an X image and a Y image of the outline of the spliced section, and the splice loss is acquired from the X and Y images. According to the conventional method for measuring a splice loss by monitoring the outline of a spliced section, however, a splice loss originated from opposite-phase core distortion cannot precisely be measured although a splice loss caused by axial deviation or angular deviation can be measured with a certain accuracy.

SUMMARY OF THE INVENTION

Accordingly, it is an object of this invention to provide a method for estimating a splice loss of an optical fiber, which method can measure a splice loss originating from opposite-phase core distortion.

It is another object of this invention to provide a splice loss estimating method for an optical fiber, which can measure, with a high accuracy, the entire splice loss including a splice loss originating from axial deviation or one originating from angular deviation.

To achieve the first object, according to one aspect of this invention, there is provided a method for estimating a splice loss of a spliced portion of an optical fiber formed by fusion-splicing a pair of optical fibers through heat treatment, which method comprises the steps of:

detecting an amount of axial deviation attained prior to, or immediately after heating a pair of optical fibers and an amount of axial deviation attained upon completion of heat treatment on the optical fibers to provide a difference between the axial deviations; and measuring a splice loss originated from an opposite-phase core distortion based on the difference between the axial distortions.

Here, the term "immediately after heating a pair of optical fibers" indicates the time period from a point when the heat treatment has started to a point when, even if glass melts by the heat treatment, the surface tension of the melted glass has not yet worked sufficiently; the period is about 2 sec or less from the point when the heat treatment has started in the ordinary case involving spark heating. The term "prior to heating ... " means the time before the heat treatment has started or the time at which heat treatment has not started yet.

To achieve the second object of this invention, according to another aspect of the invention, there is provided a method for measuring a splice loss of a spliced portion of an optical fiber formed by fusion-splicing a pair of optical fibers through heat treatment, which method comprises the steps of:

acquiring a splice loss from an amount of axial deviation upon completion of heat treatment on a pair of optical fibers, a splice loss from an amount of angular deviation upon completion of heat treatment on the optical fibers, and a splice loss originated from opposite-phase core distortion from a difference between an amount of axial deviation attained prior to and an amount of axial deviation attained upon completion of heat treatment on the optical fibers; and measuring an entire splice loss by adding the splice losses obtained in the splice-loss acquiring step.

BRIEF DESCRIPTION OF THE DRAWINGS

FIG. 13 shows a reflecting mirror onto which illuminating lights are directed; and FIG. 14 shows an apparatus for fusion-splicing a pair of single type optical fibers.

DETAILED DESCRIPTION OF THE PREFERRED EMBODIMENTS

The following are possible major causes of a splice loss:

(1) Deviation of axes of optical fibers to be fusion-spliced (axial deviation).

(2) Angular deviation of optical fibers to be fusion-spliced.

(3) Opposite-phase core distortion between optical fibers as caused by the fusion-splicing.

(4) In-phase core distortion between optical fibers as caused by the fusion-splicing.

Figure 1A:
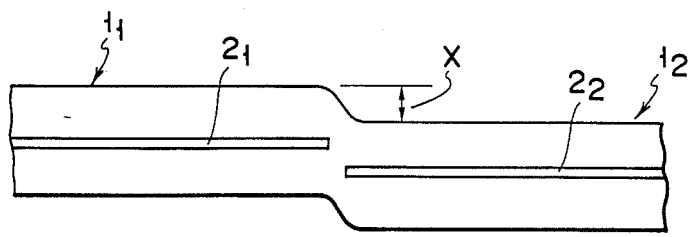
FIGS. 1A through 1D are diagrams illustrating optical fibers having defective fusion-spliced portions of various types.

The term axial deviation means a deviation of axes of fibers $1_1$ and $1_2$, i.e. a deviation of outer configurations of fibers $1_1$ and $1_2$, which is caused by fusion-splicing optical fibers $1_1$ and $1_2$ with their axes deviating from each other, as shown in FIG. 1A. Such an axial deviation occurs if the axes of the optical fibers $1_1$ and $1_2$, when butted against each other, are not aligned and heating is not sufficient.

Given that X is an amount of axial deviation and W is a spot size, the splice loss $\alpha_1$ is given by:

$$\alpha_1 = 4.34 \times (X/W)^2.$$

Figure 1B:
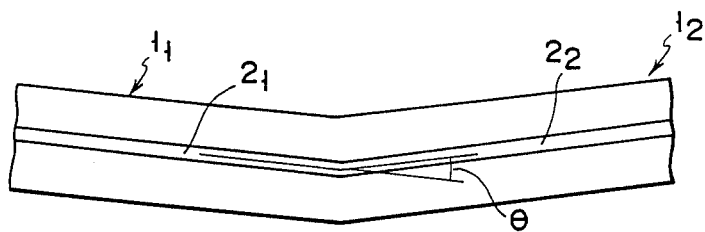

The angular deviation is caused by misalignment of ends of the optical fibers $1_1$ and $1_2$ and an excess amount of mutual pressing of these optical fibers, as shown in FIG. 1B. Given that $\theta$ is a deviation angle, $n_2$ is a refractive index of fiber core $2_1$ and fiber core $2_2$, $\lambda$ is the wavelength of light and W is the spot size, the splice loss $\alpha_2$ originating from the angular deviation is given by:

$$\alpha_2 = 10 \log [\exp \{-(\pi^2 n_2 W/180 \lambda)^2 \theta^2\}].$$

With $\lambda = 1.3$ μm, W = 5 μm and $n_2 = 1.46$, $$\alpha_2 = 4.34 \times 0.0948 \times \theta^2.$$

Figure 1C:
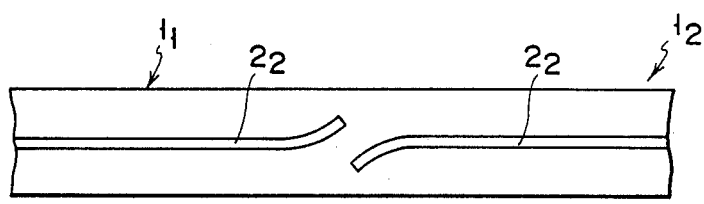
Figure 2A:
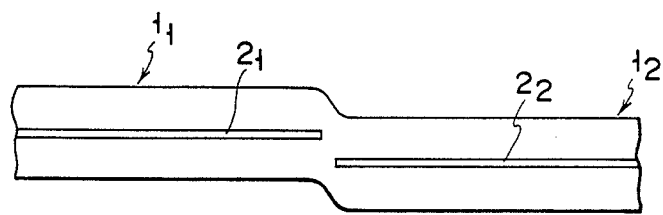
FIGS. 2A and 2B are diagrams each illustrating an optical fiber having a defective fusion-spliced portion with opposite-phase core distortion.

The opposite-phase core distortion is a bending of the cores $2_1$ and $2_2$ in the opposite direction at the spliced portion as shown in FIG. 1C, and it is caused if the axes of the optical fibers $1_1$ and $1_2$ when butted are misaligned and sufficient heat is applied to the fibers under this condition. More specifically, when the optical fibers $1_1$ and $1_2$ having their axes misaligned, are heated in this state to a certain degree, a step would be formed at the exterior of the spliced portion as shown in FIG. 2A. If heat is further applied, the step portion would disappear due to the surface tension. At this time, the cores $2_1$ and $2_2$ are bent at the spliced portion as shown in FIG. 2B.

Figure 1D:
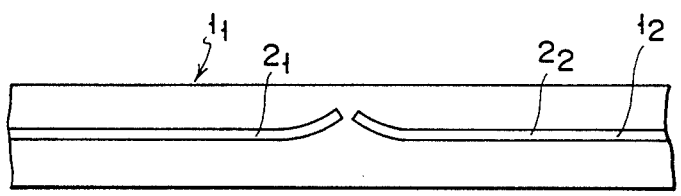

The in-phase core distortion is the bending of the cores $2_1$ and $2_2$ in the same direction at the spliced portion as shown in FIG. 1D. This distortion is caused by misalignment of the cleaved angles of fiber ends to be spliced and an insufficient amount of the optical fibers pressed. In other words, if the misalignment of the cleaved angles of the fiber ends is significant or the amount of the fibers pressed is insufficient to thereby form a neck portion or a small-diameter portion at the spliced portion, the fibers melt when heated and flow in the neck portion, thus bending the cores $2_1$ and $2_2$.

Figure 2B:
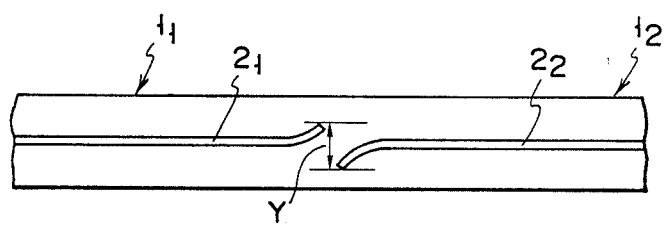

As described above, the opposite-phase core distortion occurs in this process as shown in FIGS. 2A and 2B. With this in mind, the amount of deviation is measured before or immediately after the heat treatment, and the amount of deviation is again measured upon completion of the heat treatment, and the difference Y between these deviation amounts is then acquired. This difference Y is the amount of core distortion. And the amount Y can be considered to be index for measuring the splice loss.

Figure 3:
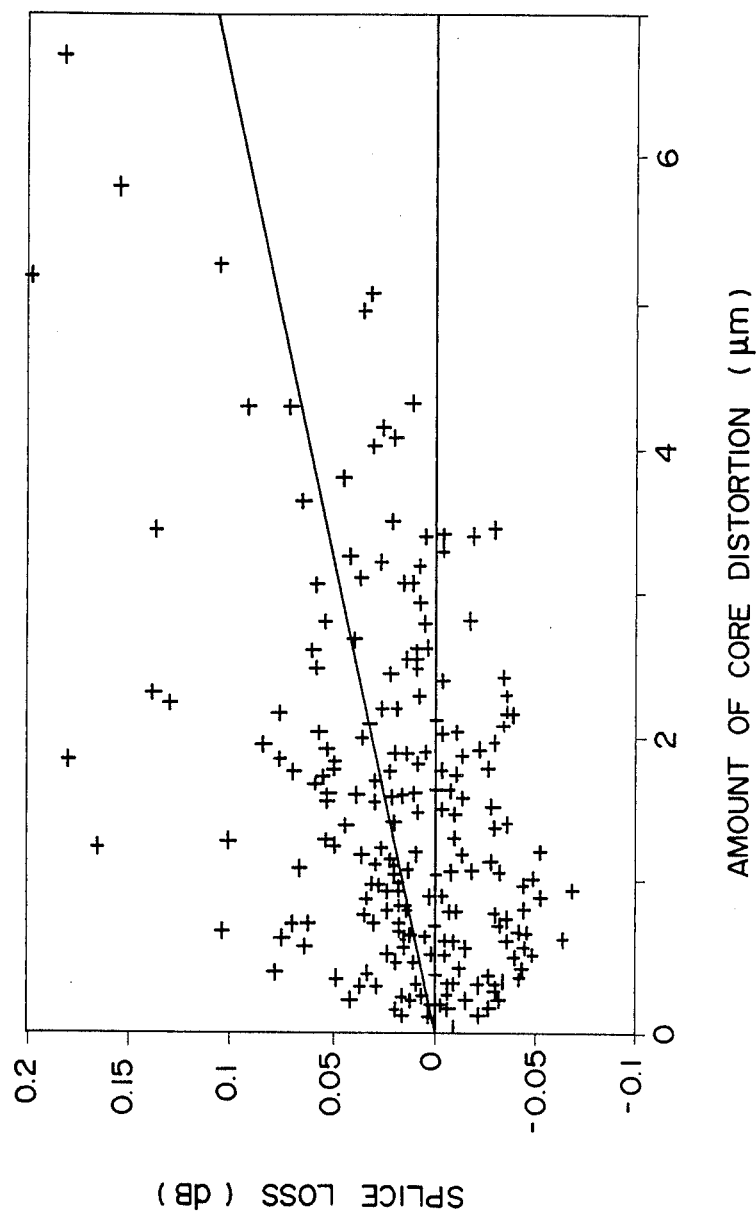
FIG. 3 is a histogram illustrating the relation between the amount of core distortion and splice loss.

To confirm this, we measured splice losses at many spliced portions by the power monitor method in order to find the relation between the core distortion amount Y and the splice loss caused by the core distortion. The acquired data includes the entire splice loss originated from axial deviation, opposite-phase core distortion and in-phase core distortion. Since the in-phase core distortion significantly increases the splice loss, however, measuring the entire splice loss including the one caused by this deviation should undesirably reduce the measuring accuracy. In this respect, therefore, data acquired from the spliced section at which the in-phase deviation occurred was eliminated. Accordingly, the entire splice loss in this case is the sum of the splice losses caused by the axial deviation, angular deviation and opposite-phase core distortion, and the measured splice loss data represents the splice loss including these three types of splice losses Since the splice losses originated by the axial deviation and angular deviation can be calculated as described above, the splice loss caused by the opposite-phase core distortion can be attained by subtracting these two splice losses from the actually acquired data. FIG. 3 illustrates the relation between the splice loss originating from the opposite-phase core distortion and the amount of the core distortion. With the regression linear line attained from this relation the splice loss $\alpha_3$ with respect to the core distortion amount Y can be calculated as follows:

$$\alpha_3 = 0.01484Y.$$

Since total splice loss is the sum of the splice loss $\alpha_1$ originating from the axial deviation the splice loss $\alpha_2$ originating from the angular deviation and the splice loss $\alpha_3$ originating from the opposite-phase core distortion, the total splice loss $\alpha$ can be measured by adding up the individually calculated losses as follows:

$$\alpha = \alpha_1 + \alpha_2 + \alpha_3.$$

In this embodiment, a pair of ribbon type optical fibers each having four single-mode optical fibers were used. The core fibers of this pair of optical fibers were fusion-spliced together and the splice losses were measured using the power monitor method. From the acquired data, the total splice loss was measured based on the measuring method according to this invention. For measurement of this splice loss, an apparatus for monitoring the spliced portion of the optical fiber from two directions was used to observe the external deviation amount of the spliced portion from two directions (X and Y directions) normal to the axes (i.e., Z axes) of the optical fibers. In this embodiment, the amount of the axial deviation was measured immediately after heat was applied for fusion-splicing the fibers and was again measured after the heat treatment was completed, the difference Y between these two deviation amounts was attained, and the splice loss was measured from this difference Y. According to this embodiment, the above measurement was executed for both of the case where fibers having their ends cleaved by the proper cutter were fusion-spliced and the case where fibers having their ends cleaved by an intentionally unadjusted cutter. The reason for using those fibers with their ends cleaved by the unadjusted cutter is to generate many defective spliced portions and to effectively evaluate the measuring function of this invention.

Figure 4:
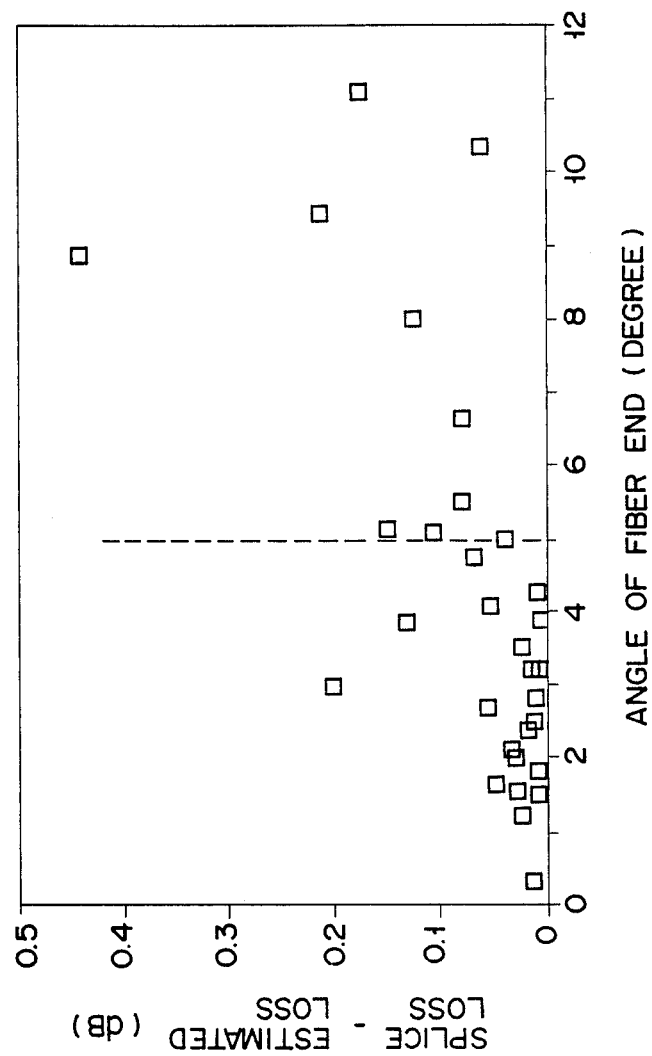
FIG. 4 is a graph illustrating the relation between the cleaved angle of an optical fiber end and the splice loss—estimated loss.

As described above, if the angle between the fiber ends is large, the in-phase core distortion would occur With this in mind, therefore, we acquired data of the relation between the angle between the fiber ends and the measured splice loss - estimated splice loss. The results are shown in FIG. 4 from which it should be understood that with the angle greater than 5 degrees, an increase in loss difference between measured splice loss and estimated splice loss becomes large, and so does the error. Accordingly, for those fibers having an angle of more than 5 degrees between their ends, the fusion-splicing was not carried out and no data was acquired.

Figure 5:
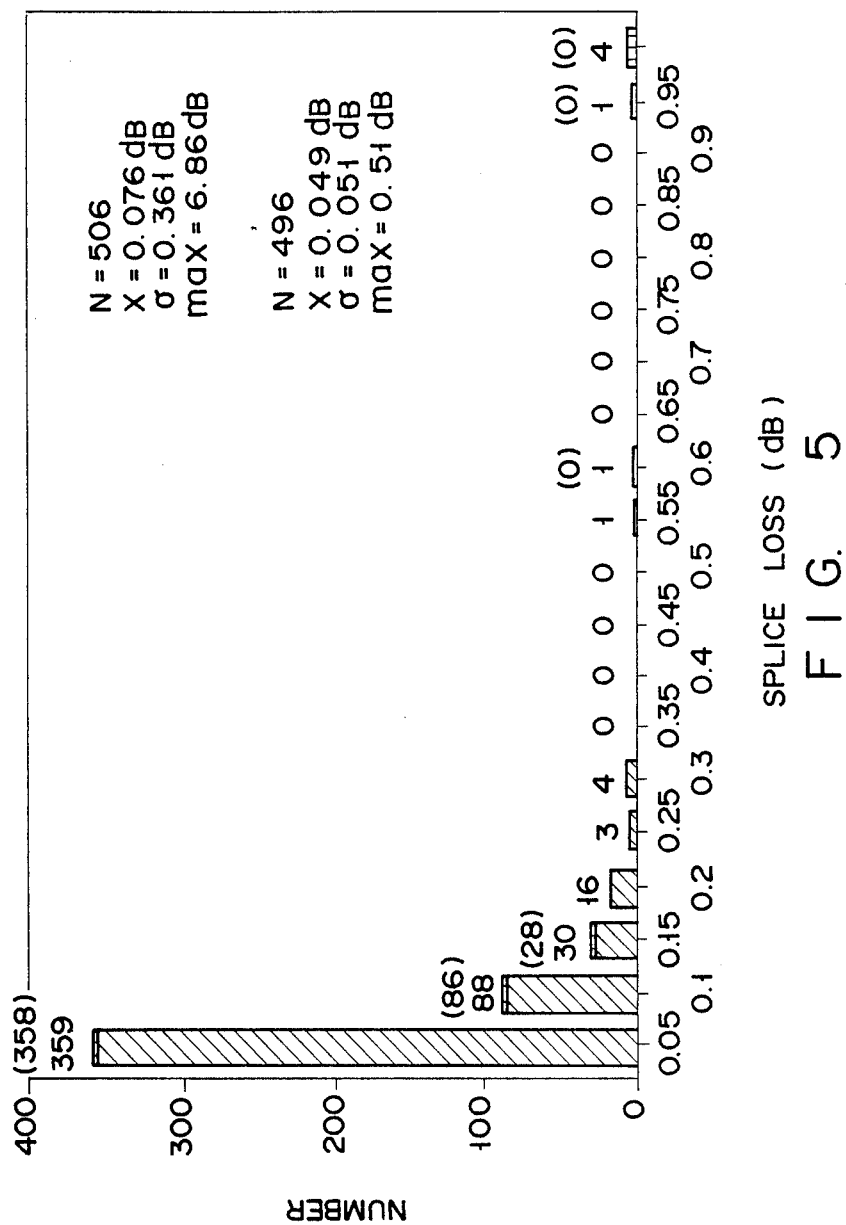
FIG. 5 is a histogram illustrating the relation between the number and the splice loss of a spliced provided by fusion-spliced optical fibers having splicing ends cleaved by the proper cutter.
Figure 6:
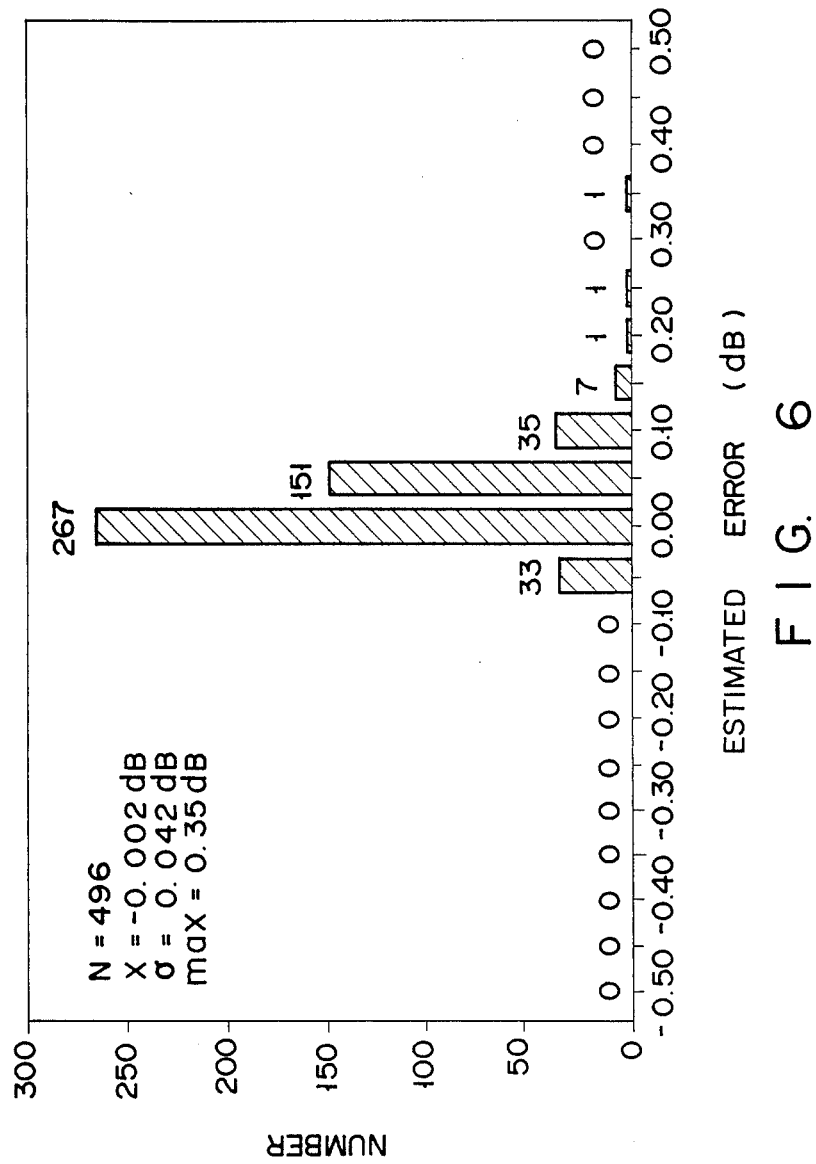
FIG. 6 is a histogram illustrating the relation between the number and the estimated error of the spliced portion provided by fusion-spliced optical fibers having splicing ends cleaved by the proper cutter.
Figure 7:
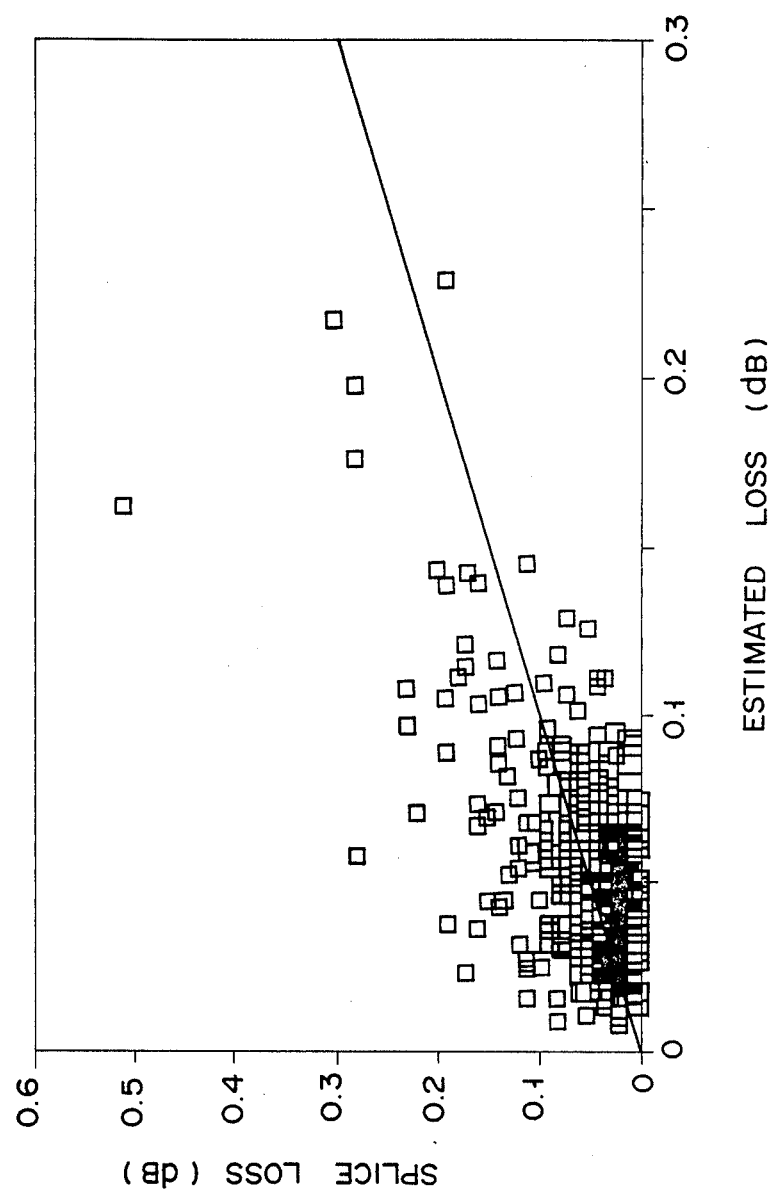
FIG. 7 is a graph illustrating the relation between the estimated loss and splice loss of the spliced portion provided by fusion-spliced optical fibers having splicing ends cleaved by the proper cutter.

FIG. 5 is a histogram of the splice losses (measured by the power monitor method) of the spliced portions formed by fusion-splicing those optical fibers having their ends cleaved by the proper cutter FIG. 6 is a histogram of the errors (estimated errors) of the estimated losses (total) with respect to the splice losses. The relation between the splice losses and the estimated losses is illustrated in FIG. 7. Average value of the estimated errors on the histogram shown in FIG. 6 is −0.002 dB, and the standard deviation is 0.042 dB. These data are satisfactory.

Figure 8:
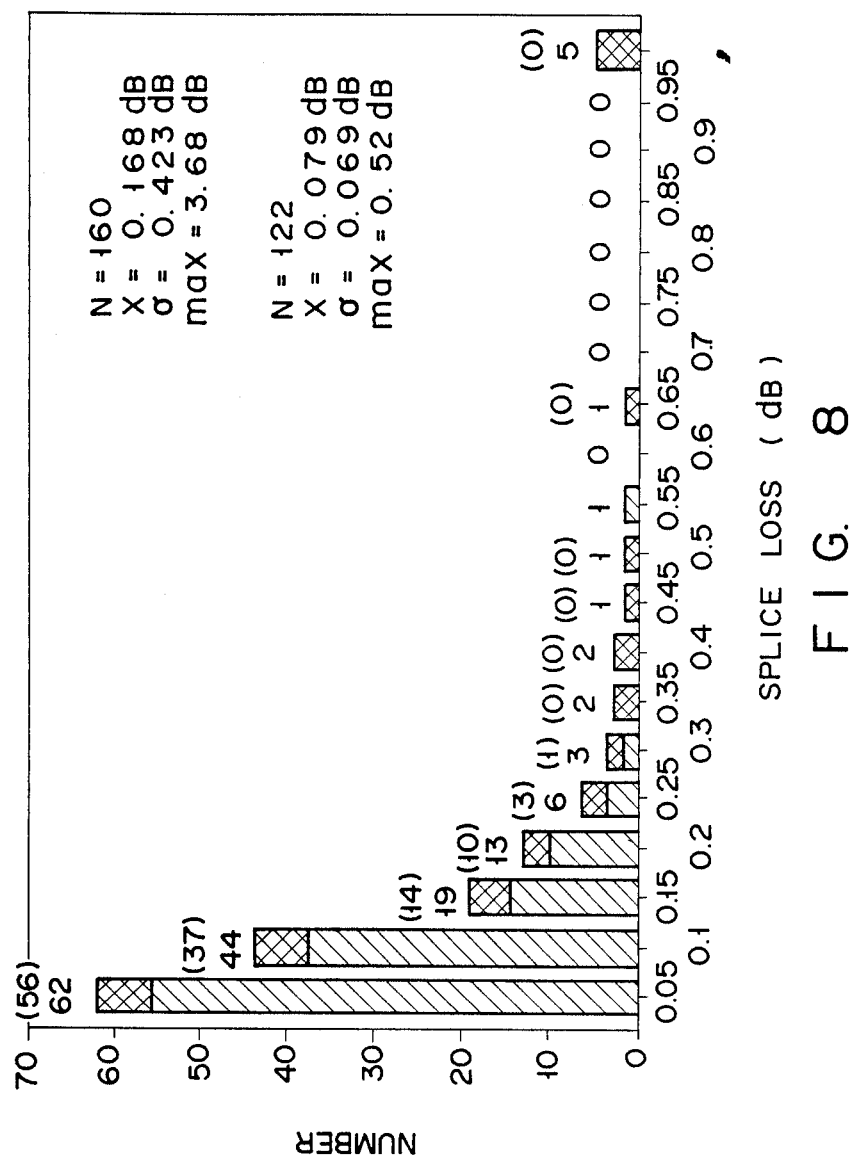
FIG. 8 is a histogram illustrating the relation between the number and the splice loss of a spliced portion provided by fusion-spliced optical fibers having splicing ends cleaved by an unadjusted cutter.
Figure 9:
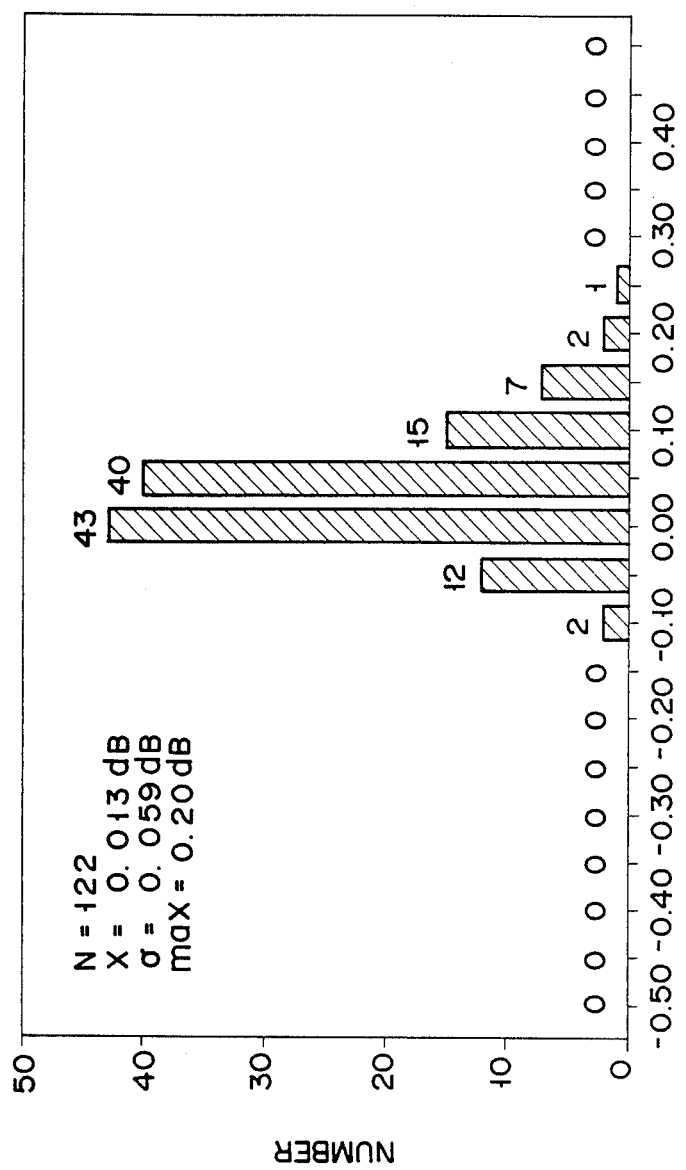
FIG. 9 is a histogram illustrating the relation between the number and the estimated error of the spliced portion provided by fusion-spliced optical fibers having splicing ends cleaved by the unadjusted cutter.
Figure 10:
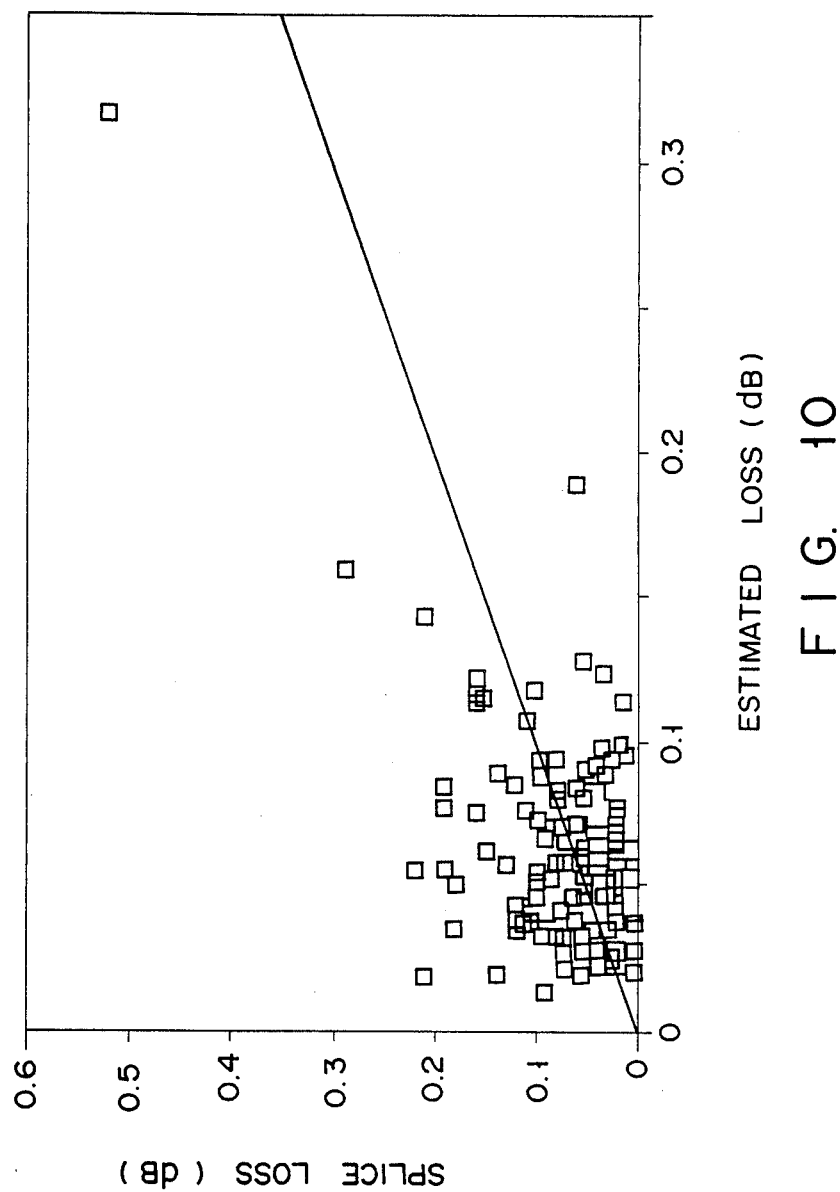
FIG. 10 is a graph illustrating the relation between the estimated loss and splice loss of the spliced portion provided by fusion-spliced optical fibers having splicing ends cleaved by the unadjusted cutter.

FIG. 8 is a histogram of the splice losses of the spliced portions formed by fusion-splicing those optical fibers having their ends cleaved by the unadjusted cutter. FIG. 9 is a histogram of the estimated errors of this case, and FIG. 10 illustrates the relation between the splice losses and the estimated losses. In this case, the average of the estimated error was 0.013 dB and the standard deviation was 0.059 dB, about the same values as those obtained in the former case involving the optical fibers with their ends cleaved by the proper cutter.

These results are illustrated in Tables 1 and 2 below, the former illustrating the data associated with the optical fibers with their ends cleaved by the proper cutter and the latter illustrating the data associated with the fibers with their ends cleaved by the unadjusted cutter.

From these tables, it should be noted that, for either cutter, this average splice loss is less than 0.1 dB and the splice failure ratio is 2% for the proper cutter, making this embodiment sufficiently practical (see particularly FIGS. 5 and 8).

Figure 11:
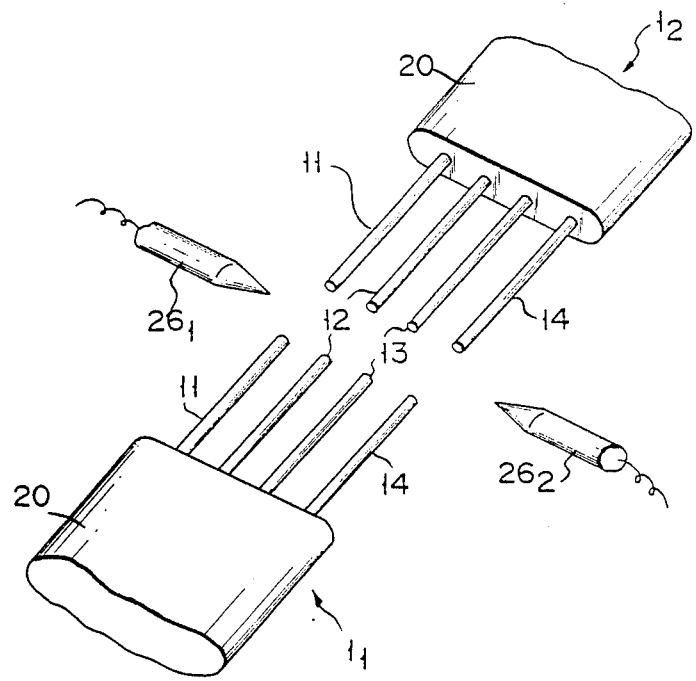
FIG. 11 shows a pair of ribbon type optical fibers to be fusion-spliced.

Referring to FIG. 11, ribbon type optical fibers $1_1$ and $1_2$ each have a tape-like shape, and each comprise four parallel single-mode optical fibers 11 to 14. Protection jackets 20 are removed from those ends of the parallel fibers 11-14 of the optical fibers $1_1$ and $1_2$, which are to be fusion-spliced.

Figure 12:
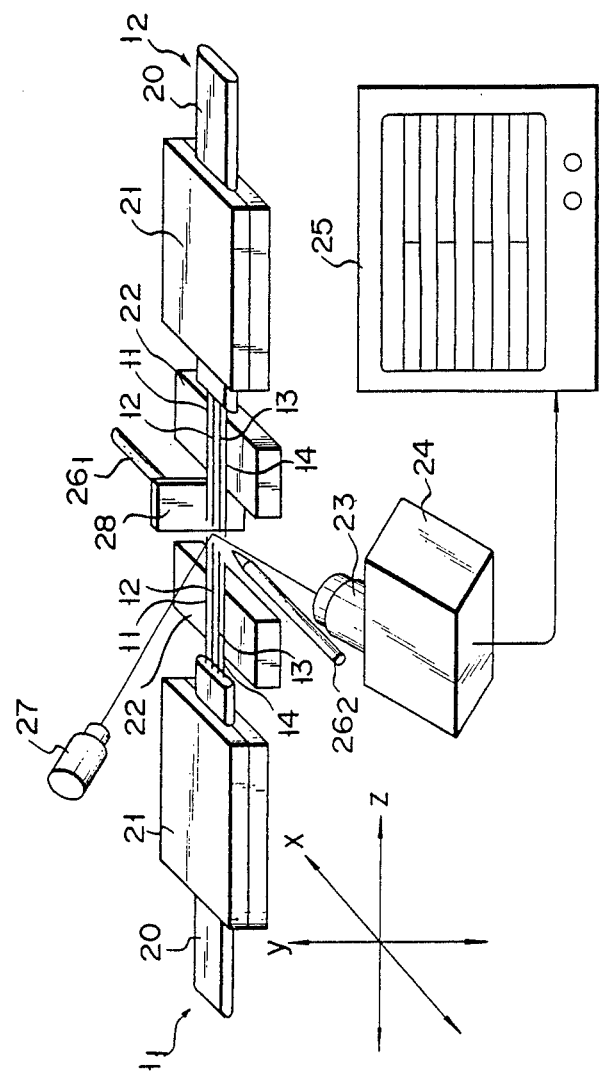
FIG. 12 shows an apparatus for fusion-splicing a pair of ribbon type optical fibers.

To fusion-splice optical fibers $1_1$ and $1_2$, jacketed portion 20 of each ribbon optical fiber is clamped by adapter 21, as shown in FIG. 12. Adapter 21 is accommodated in a guide groove (not shown) formed in the body (not shown) of the apparatus. Optical fibers 11-14 of each of optical fibers $1_1$ and $1_2$ are set in V-grooves (not shown) of V-groove block 22 mounted on the apparatus body, so that the end faces of optical fibers 11-14 of one optical fiber $1_1$ are opposed to the end faces of optical fibers 11-14 of the other optical fiber $1_2$. Adapters 21 are then moved in Z direction (FIG. 12), so that an initial interval is set between the optical fibers 11-14 of optical fiber $1_1$ and the optical fibers 11-14 of optical fiber $1_2$, while monitoring the ends of the optical fibers 11-14 of the optical fibers $1_1$ and $1_2$ by a monitoring method using microscope 23, TV (television) camera 24, and TV monitor 25 (FIG. 12). Then, heat of an arc discharge is applied via discharge electrodes $26_1$ and $26_2$ to the ends of the optical fibers 11-14 of optical fibers $1_1$ and $1_2$ to round the fiber ends so that the fiber ends may be strongly fusion-spliced at a following splicing step. Thereafter, heat of an arc discharge is applied via discharge electrodes $26_1$ and $26_2$ to the ends of the optical fibers 11-14 of optical fibers $1_1$ and $1_2$ (FIG. 12), while the optical fibers 11-14 of the optical fibers $1_1$ and $1_2$ are moved toward one another. Immediately after heat is applied to the optical fibers 11-14, the amount of the axial deviation Dx1 between the optical fibers 11-14 of ribbon optical fibers $1_1$ and the optical fibers 11-14 of ribbon optical fibers $1_2$ are measured, by monitoring the X images of the optical fibers 11-14 using microscope 23, TV camera 24, and TV monitor 25. Thereafter, while further applying an arc to the ends of the optical portions 11-14, adapters 21 are further moved toward one another in Z direction and abutted against each other, so that the optical fibers 11-14 are completely fusion-spliced. After the optical fibers 11-14 are completely fusion-spliced, that is, the heat treatment is completed, the amount of the axial deviation Dx2 between the optical fibers 11-14 of ribbon optical fibers $1_1$ and the optical fibers 11-14 of ribbon optical fibers $1_2$ is measured, by monitoring the X images of the optical fibers 11-14 using microscope 23, TV camera 24, and TV monitor 25. In substantially the same manner, deviations Dy1 and Dy2 in Y images corresponding to deviations Dx1 and Dx2 are measured. By performing $\sqrt{Dx1^2 + Dy1^2}$, deviation D1 which occurs immediately after heat is applied can be obtained. By performing $\sqrt{Dx2^2 + Dy2^2}$, deviation D2 which occurs after the fibers are completely spliced can be obtained. Thereafter, the difference between deviations D1 and D2 is calculated to provide a core distortion of the fibers.

Deviations Dx1 and Dy1 may be measured prior to applying an arc to the fibers.

In order to obtain the television image of the optical fibers 11-14 by the disclosed system, illuminating lights l1 and l2 (FIG. 13) are emitted from light source 27 (FIG. 12). Lights l1 and l2 are directed in a direction shifted by 45° from the normal direction of a plane which is formed by the optical fibers 11-14. Illuminating light l1 is reflected by reflecting mirror 28 and then passed through optical fibers 11-14. Illuminating light l2 is passed through optical fibers 11-14 and then reflected by reflecting mirror 28. The reflected light l1 is picked up by TV camera 24 through microscope 23 and transferred to TV monitor 25 to display images X of the optical fibers 11-14 on the monitor screen. In order to pick up illuminating light l2, microscope 23 and TV camera 24 are slightly moved. The reflected light l2 is picked up by TV camera 24 through microscope 23 and transferred to TV monitor 25 to display images Y of the optical fibers 11–14 on the monitor screen.

Referring to FIG. 14, single type optical fibers $1_1$ and $1_2$ are shown, together with a fusion splicing apparatus. Protection jackets are removed for fusion-splice. Optical fibers $1_1$ and $1_2$ are supported in V-grooves of V-groove members $30_1$ and $30_2$ to oppose each other in the Z direction (FIG. 14). Thereafter, an abutment rod or a stopper (not shown) is located between optical fibers $1_1$ and $1_2$, and optical portions $1_1$ and $1_2$ are moved closed to each other in the Z direction until fiber portions $1_1$ and $1_2$ are brought into contact with the stopper, thereby setting an initial distance between fiber portions $1_1$ and $1_2$. Thereafter, the stopper is removed. Then, heat of an arc discharge is applied via discharge electrodes $26_1$ and $26_2$ to the ends of the optical fibers $1_1$ and $1_2$ to round the fiber ends so that the fiber ends may be strongly fusion-spliced at the following splicing step. Thereafter, heat of an arc discharge is applied via discharge electrode $26_1$ and $26_2$ to the ends of the optical fibers $1_1$ and $1_2$, while the optical fibers are moved toward one another. Immediately after heat is applied to the optical fibers $1_1$ and $1_2$ the amount of the axial deviation Dx1 between the optical fibers $1_1$ and $1_2$ is measured, by monitoring the X image of the optical fibers $1_1$ and $1_2$ using microscope 23, TV camera 24, and TV monitor 25. After, while further applying an arc to the ends of the optical fibers $1_1$ and $1_2$, the optical fibers are further moved toward one another in the Z direction and abutted against each other, so that optical fibers are completely fusion-spliced. After the optical fibers $1_1$ and $1_2$ are completely fusion-spliced, that is, the heat treatment is completed, the amount of the axial deviation Dx2 between the optical fibers $1_1$ and $1_2$ is measured, by monitoring the X image of the optical fibers $1_1$ and $1_2$ using microscope 23, TV camera 24, and TV monitor 25.

In substantially the same manner, deviations Dy1 and Dy2 in Y image are measured. The manner in which a core distortion of the fibers are measured is substantially the same in the ribbon type fibers. Therefore, the description thereof is omitted.

Deviations Dx1 and Dy1 may be measured prior to applying an arc to the fibers.

In this embodiment, two light sources 32 and 34 are used to emit X-direction light Lxx and Y-direction light Lxy, respectively. Light Lxx is passed through the fiber ends in X-direction and picked up through microscope 23 by TV camera 24. Light Lxy is first passed through the fiber ends in Y-direction, then reflected by reflecting mirror 28, and finally picked up through microscope 23 by TV camera 24. TV monitor 25 displays the X and Y images of the fiber ends on the monitor screen based on the picked up lights by TV camera 24.

According to this embodiment, the estimated losses originating from the opposite-phase core distortion were attained from the difference between the amounts of axial deviation immediately after the fusion-splicing and upon completion of the heat treatment. With a slight error allowed, however, it is possible to measure the amount of axial deviation before the heat application and use this value. In other words, although the amount the axes of the fibers are deviated by the pressing force applied thereto at the time of fusion-splicing becomes an error in this case, it is possible to eliminate the measurement step immediately after the heat application.

According to the fiber splice loss estimating method of this invention, the splice loss originated from the opposite-phase core distortion and the total splice loss can be measured with a high accuracy by observing the outline of the spliced section. This method can ensure easy detection of defective spliced portions, and is therefore suitable for field works where the fibers are installed. In addition, the use of this method in fusion-splicing ribbon type optical fibers together can further improve the efficiency of the splicing operations.

TABLE 1

(Data About Optical Fibers Cleaved by Proper Cutter)

|  |  | Number of Fusion-Spliced Splice Portions | Number of Splice Portions (Excluding Those At Which In-phase Core Distortion Has Occurred) |
|---|---|---|---|
| Number of Fibers |  | 506 | 496 |
| Splice Loss (dB) | Average | 0.076 | 0.049 |
|  | Standard Deviation | 0.361 | 0.051 |
|  | Maximum | 6.86 | 0.51 |
| Estimated Loss (dB) | Average | — | −0.002 |
|  | Standard Deviation | — | 0.042 |
|  | Maximum | — | 0.35 |

TABLE 2

(Data About Optical Fibers Cleaved by Unadjusted Cutter)

|  |  | Number of Fusion-Spliced Slice Portions | Number of Splice Portions (Excluding Those At Which In-phase Core Distortion Has Occurred) |
|---|---|---|---|
| Number of Fibers |  | 160 | 122 |
| Splice Loss (dB) | Average | 0.168 | 0.079 |
|  | Standard Deviation | 0.423 | 0.069 |
|  | Maximum | 3.68 | 0.52 |
| Estimate Loss (dB) | Average | — | 0.013 |
|  | Standard Deviation | — | 0.059 |
|  | Deviation | — | 0.059 |
|  | Maximum | — | 0.20 |

What is claimed is:

1. A method of estimating a splice loss of a spliced portion of an optical fiber formed by fusion-splicing a pair of optical fibers through heat treatment, which method comprises the steps of:
   detecting a first amount of axial deviation attained prior to or immediately after heating a pair of optical fibers;
   detecting a second amount of axial deviation attained upon completion of heat treatment on said optical fibers;
   determining a difference between said first and said second axial deviations; and
   measuring a splice loss originating from an opposite-phase core distortion based on said difference between said axial deviations.

2. A method of estimating a split loss of a spliced portion of an optical fiber formed by fusion-splicing a pair of optical fibers through heat treatment, which method comprises the steps of:
   acquiring a splice loss from an amount of axial deviation upon completion of heat treatment on a pair of optical fibers, a splice loss from an amount of angular deviation upon completion of heat treatment on said optical fibers, and a splice loss originating from opposite-phase core distortion from a difference between a first amount of axial deviation attained prior to or immediately after heating said optical fibers and a second amount of axial deviation attained upon completion of heat treatment on said optical fibers; and determining an entire splice loss by adding said splice losses obtained in said splice-loss acquiring step.

3. The method according to claim 1, wherein said first and second amounts of axial deviation of said optical fibers are measured by observing an amount of deformation of a monitored image of said optical fibers.

4. The method according to claim 2, wherein said amounts of axial deviation of said optical fibers or said amount of angular deviation thereof is measured by observing an amount of deformation of a monitored image of said optical fibers.

5. The method according to claim 1, wherein at a time a plurality of single-mode optical fibers of a pair of ribbon type optical fibers are fusion-spliced together, a splice loss of said single-mode optical fibers is measured.

6. The method according to claim 2, wherein at a time a plurality of single-mode optical fibers of a pair of ribbon type optical fibers are fusion-spliced together, a splice loss of said single-mode optical fibers is measured.

7. The method according to claim 3, wherein at a time a plurality of single-mode optical fibers of a pair of ribbon type optical fibers are fusion-spliced together, a splice loss of said single-mode optical fibers is measured.

* * * * *